United States Patent [19]

Okamoto et al.

[11] Patent Number: 5,652,840
[45] Date of Patent: Jul. 29, 1997

[54] COMMUNICATION CONTROL APPARATUS FOR A SMALL-SCALE NETWORK

[75] Inventors: Yasushi Okamoto; Sukehisa Noda, both of Itami, Japan

[73] Assignee: Mitsubishi Denki Kabushiki Kaisha, Japan

[21] Appl. No.: 371,944

[22] Filed: Jan. 12, 1995

Related U.S. Application Data

[63] Continuation-in-part of Ser. No. 954,442, Sep. 30, 1992, abandoned.

[30] Foreign Application Priority Data

Oct. 8, 1991 [JP] Japan .................................. 3-260279

[51] Int. Cl.$^6$ .................................. G06F 13/42; H04J 3/24
[52] U.S. Cl. .................................. 395/200.16; 395/200.17; 340/825.52
[58] Field of Search .................................. 340/825.7, 825.01, 340/825.5, 825.52, 825.51; 370/85.1, 93, 94.1, 85.13; 395/200.16, 200.17

[56] References Cited

U.S. PATENT DOCUMENTS

| | | | |
|---|---|---|---|
| 4,604,620 | 8/1986 | Oho et al. | 340/825.07 |
| 4,760,572 | 7/1988 | Tomikawa | 340/825.52 |
| 4,845,708 | 7/1989 | Herrmann, Jr. et al. | 370/85.1 |
| 4,864,568 | 9/1989 | Sato et al. | 340/825.01 |
| 4,872,162 | 10/1989 | Tanaka et al. | 370/94.1 |
| 4,914,654 | 4/1990 | Matsuda et al. | 370/85.1 |
| 4,942,571 | 7/1990 | Möller et al. | 370/85.1 |
| 5,060,228 | 10/1991 | Tsutsui et al. | 370/85.13 |
| 5,122,948 | 6/1992 | Zapolin | 340/825.07 |
| 5,524,213 | 6/1996 | Dais et al. | 395/200.17 |
| 5,553,308 | 9/1996 | Vink | 395/200.17 |
| 5,559,962 | 9/1996 | Okamura et al. | 395/200.16 |
| 5,566,176 | 10/1996 | Chang | 395/200.17 |
| 5,583,996 | 12/1996 | Tsuchiya | 395/200.16 |

FOREIGN PATENT DOCUMENTS 2-155397   6/1990   Japan .

OTHER PUBLICATIONS

Japanese Office Action of Dec. 10, 1996 (original and English translation), citing Patent Laid–Open Specification No. 2–155397.

*Primary Examiner*—Larry D. Donaghue
*Assistant Examiner*—Mark H. Rinehart
*Attorney, Agent, or Firm*—Townsend and Townsend and Crew; Larry Mendenhall

[57] ABSTRACT

A communication control apparatus comprising a transmission source/destination address storing unit which stores transmission source addresses specifying a plurality of signal input terminals, and transmission destination addresses paired in advance with signal input terminals in advance; a transmission signal generating unit which adds transmission source addresses and transmission destination addresses corresponding to signal input terminals to which signals have been input; a reception source/destination address storing unit which stores reception source addresses, specifying a plurality of signal output terminals, and reception destination addresses, specifying the transmission source of signals; and a reception signal decoding unit which outputs a signal to one or a plurality of output terminals having the reception source/destination address, stored in the reception source/destination address storing unit, matching the transmission source/destination address transmitted. The communication control apparatus is capable of transmitting a plurality of signals to a plurality of destinations through a communication line without any assistance of another apparatus and is capable of receiving in the same way.

15 Claims, 23 Drawing Sheets

SOF: START OF FRAME
  A : PRIORITY CODE
  B : DESTINATION ADDRESS
  C : SELF ADDRESS
  D : DATA
  E : CRC ERROR CHECK CODE
EOD: END OF DATA
  F : RSP, ACK/NAK CODE (IFR)
EOF: END OF FRAME

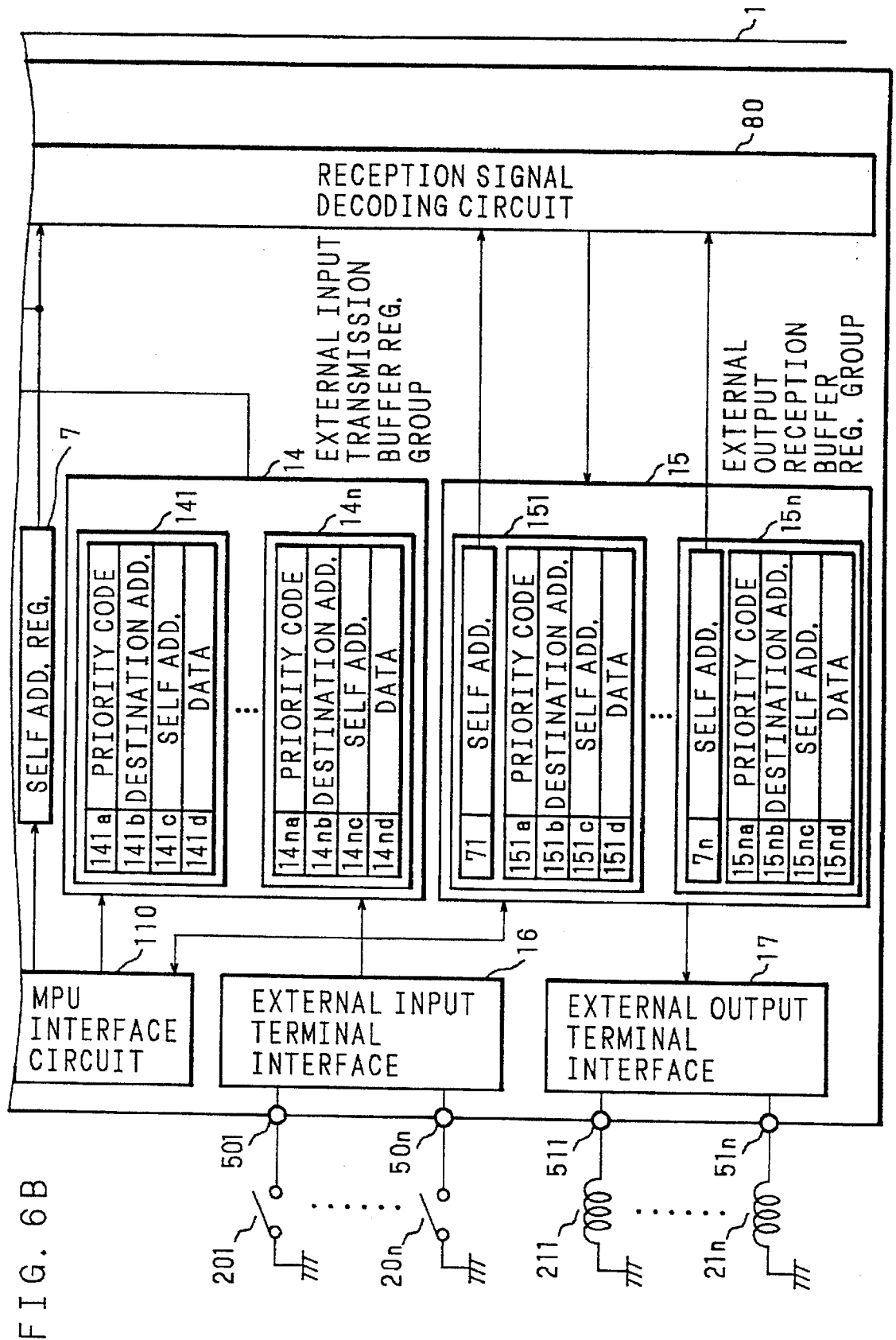

FIG. 7

| FIG. 7A |
|---|
| FIG. 7B |

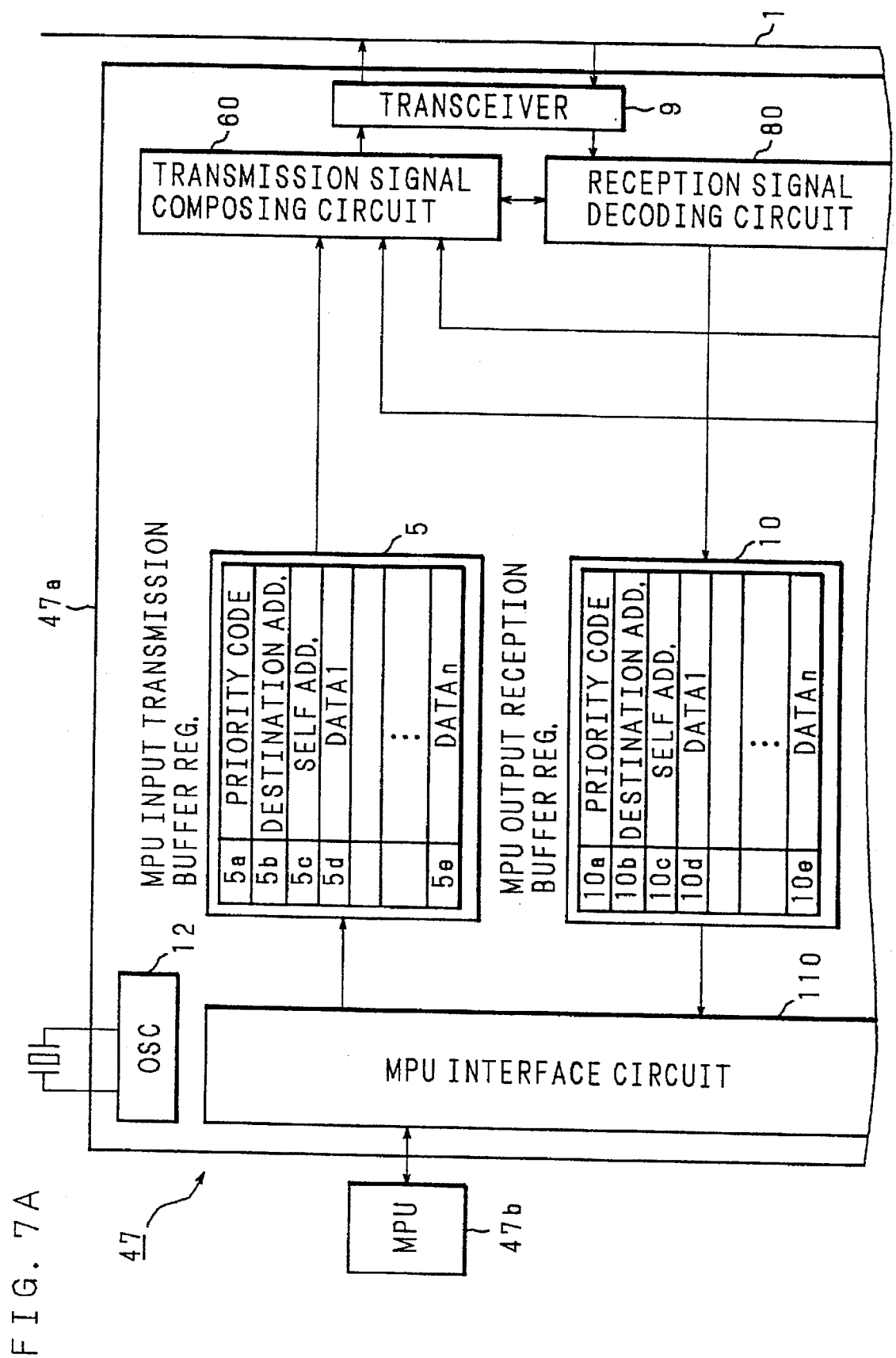

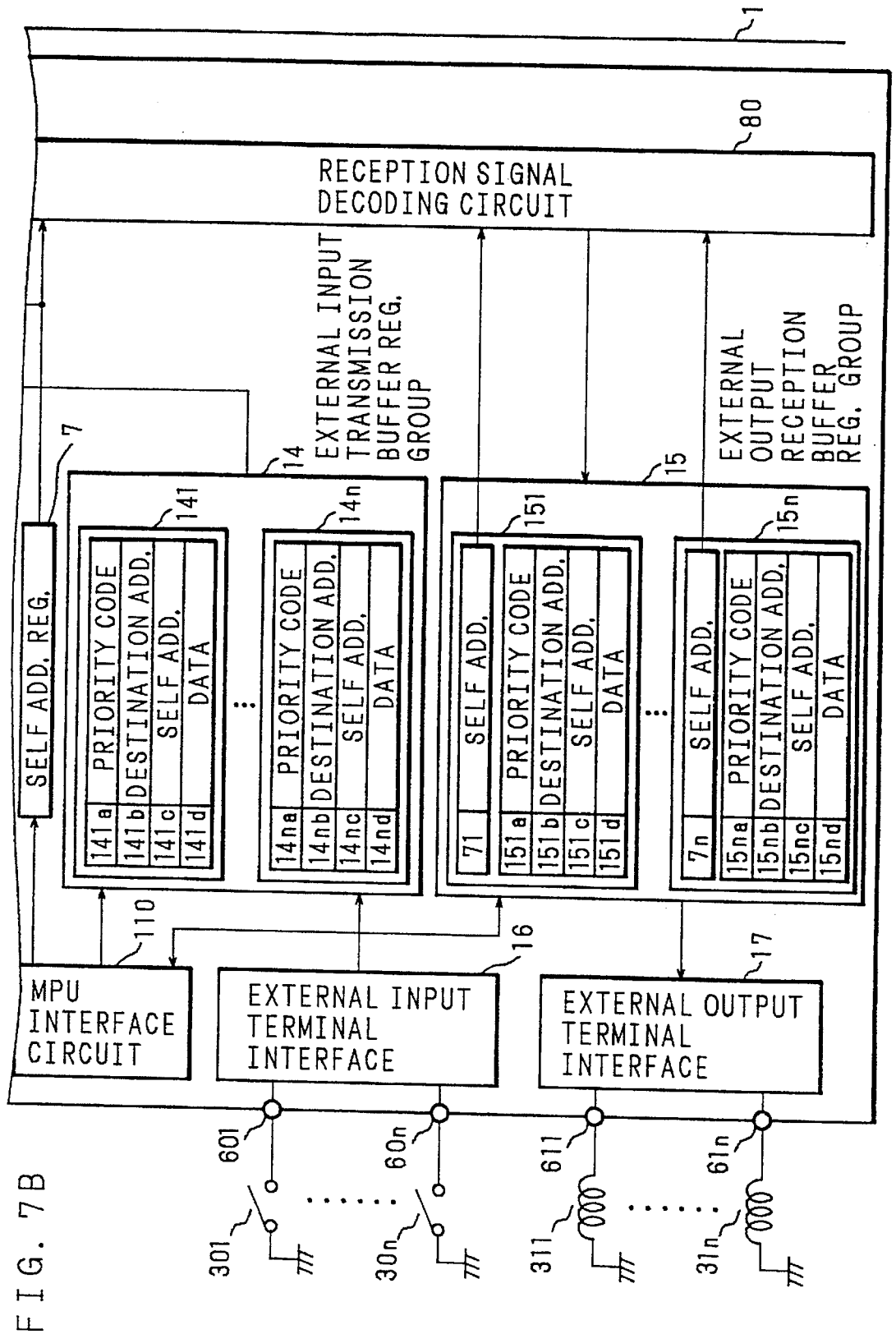

FIG. 8

| FIG. 8A |
|---|
| FIG. 8B |

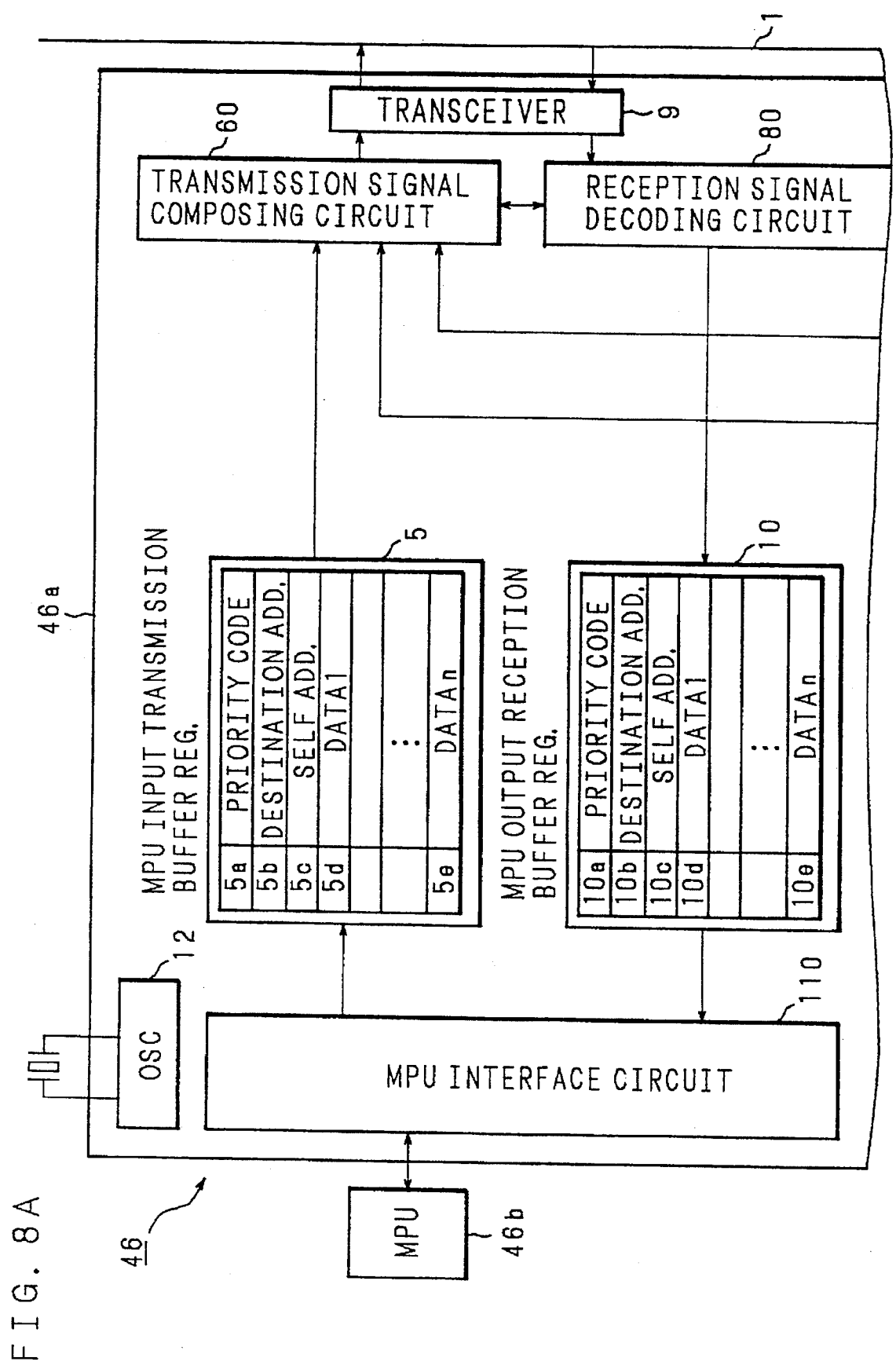

FIG. 9

| FIG. 9A |
|---|
| FIG. 9B |

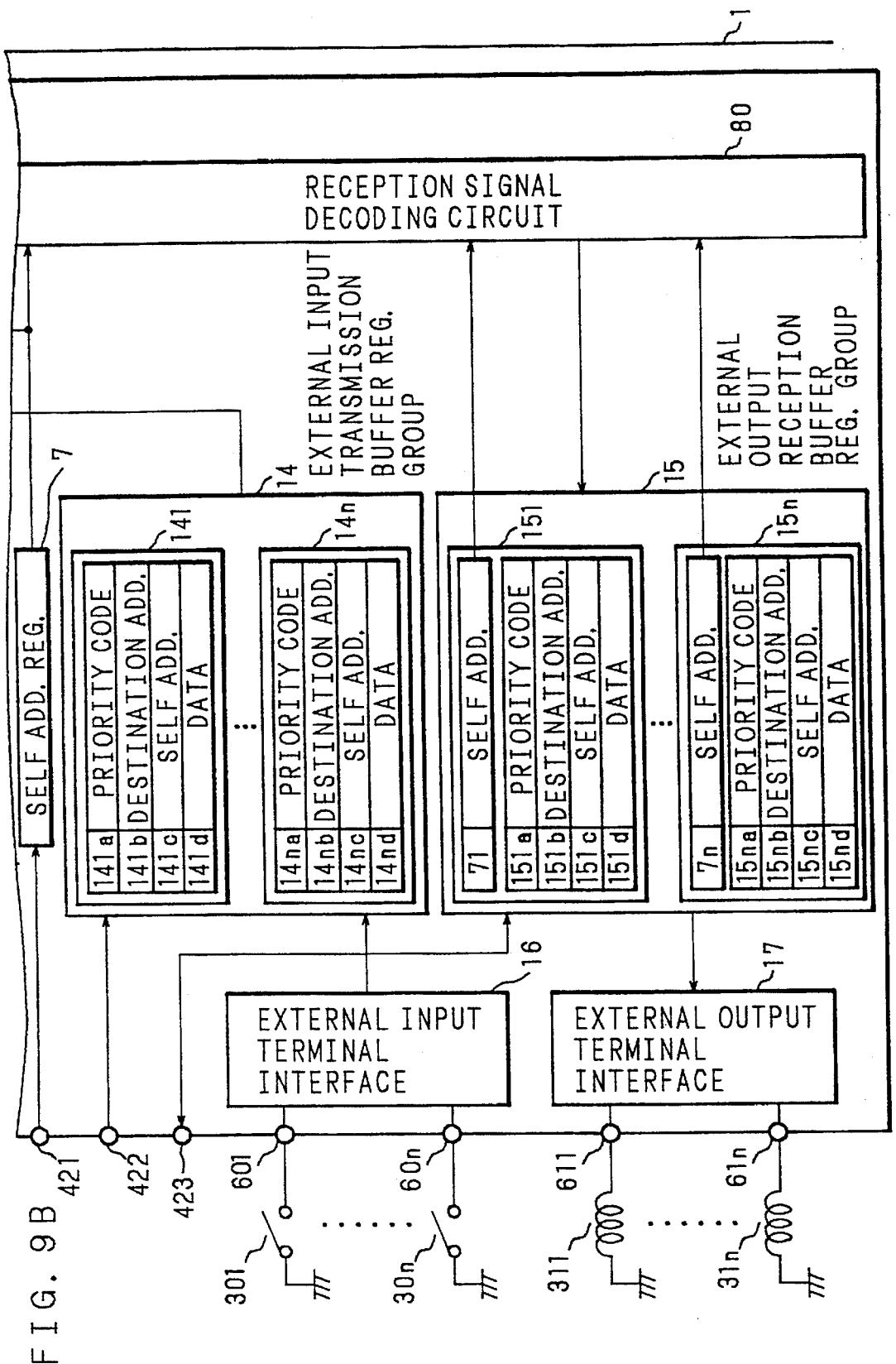

FIG. 10

| FIG. 10A |
|---|
| FIG. 10B |

COMMUNICATION CONTROL APPARATUS FOR A SMALL-SCALE NETWORK

This application is a continuation-in-part of application Ser. No. 07/954,442, filed Sep. 30, 1992, abandoned.

BACKGROUND OF THE INVENTION

The present invention relates to a communication control apparatus used in a local area network (LAN) system or other small scale network. The invention particularly relates to LAN systems or the like installed in a moving body such as a vehicle.

FIG. 1 is a schematic of a conventional LAN system to be installed in a vehicle. FIGS. 2 and 3 are block diagrams showing the inner configuration of LAN ICs 2a and 3a, respectively. A LAN IC is a communication control apparatus for connection to LAN wiring. Generally, a plurality of terminals are connected to LAN wiring.

In the example of FIG. 1, FIG. 2 and FIG. 3, four terminals 41, 42, 43 and 44 are connected to transmission line 1, the LAN wiring. Each of the terminals 41, 42, 43 and 44 has a LAN IC and a microprocessor unit. An explanation of terminals 42 and 43 is given below.

LAN ICs 2a and 3a of terminals 42 and 43, respectively, are connected to transmission line 1. LAN ICs 2a and 3a are respectively connected to microprocessor units (MPU) 2b and 3b. Each MPU 2b and 3b produces and processes communication data. Actuator 20, driven by MPU 2b, is connected to MPU 2b of terminal 42. Switch 30 is connected to MPU 3b of terminal 43.

LAN ICs 2a and 3a are configured as shown in FIG. 2 and FIG. 3, respectively.

LAN IC 2a (and 3a) is provided with an oscillator 12, MPU interface circuit 11, MPU input transmission buffer register 5, transmission signal composing circuit 6, transceiver 9, reception signal decoding circuit 8, and MPU output reception buffer register 10. Oscillator 12 creates an internal system clock for the IC. MPU interface circuit 11 is an interface with MPU 2b (or MPU 3b). MPU input transmission buffer register 5 temporarily stores data to be transmitted from MPU 2b (or MPU 3b). Transmission signal composing circuit 6 converts the data to be transmitted into communication frame format. Transceiver 9 is physically connected to transmission line 1. Reception signal decoding circuit 8 reads communication frame format transmitted and received on transmission line 1. MPU output reception buffer register 10 temporarily stores unique address assigned to terminal 42 (LAN IC 2a) (or to terminal 43 (LAN IC 3a)).

FIG. 4 shows an example of the communication frame format transmitted and received on transmission line 1. The communication frame format is composed of code SOF (Start of Frame) 101 which indicates the start of the frame, code A (priority code) 102 which authorizes the occupation of transmission line 1, code B (destination address) 103 which indicates a destination of the transmission, code C (self address) 104 which indicates the transmission source, code D (data) 104 that is the data to be transmitted, error detecting code E (CRC error detecting code) 106, EOD (End of Data) 107 which indicates the end of the transmission data, and code F (IFR:In Frame Response) 108 which is the ACK/NAK code sent back from the data-receiving terminal which has received the data. The communication frame format terminates with code EOF (End of Frame) 109.

The operation of the above-mentioned conventional LAN IC is given below.

Referring to FIG. 3, the transmitting operation is explained. It is assumed that when switch 30, connected to MPU 3b of terminal 43 is turned on, terminal 43 composes data indicating that switch 30 is turned on into the communication frame and transmits it to terminal 42.

When switch 30 is turned on, the event is detected by MPU 3b, then the transmission data is written into MPU input transmission buffer register 5 using MPU interface circuit 11 in LAN IC 3a. The transmission data which MPU 3b writes into MPU input buffer register 5 is as follows: the priority code that indicates the occupation authorization of transmission line 1 is stored in field 5a, the destination address which indicates the transmission destination is stored in field 5b, the self address which indicates the transmission source is stored in field 5c, and the data which indicates that the switch is turned on is stored in fields 5d through 5e.

The unique address assigned to terminal 42, that is, the self address of terminal 42, is written into field 5b of MPU input transmission buffer register 5 as the destination address indicating the transmission destination. MPU 3b has been previously programmed to write data into MPU input transmission buffer register 5 when it detects that switch 30 has been turned on.

After all the transmission data is written into the fields of MPU input transmission buffer register 5, transmission signal composing circuit 6 composes a communication frame (as shown in FIG. 4, for example), computes and adds a CRC code, then transmits that communication frame over transmission line 1 using receiver 9.

Referring to FIG. 2, the receiving operation is explained. It is assumed that terminal 42 activates actuator 20 connected to MPU 2b when terminal 42 receives the communication frame which includes data indicating that switch 30 in terminal 43 has been turned on.

In LAN IC 2a in terminal 42, transceiver 9 inputs the communication frame on transmission line 1 to reception signal decoding circuit 8. Reception signal decoding circuit 8 compares code B 103 (the destination address) in the communication frame with its self address, a unique address previously written in self address register 7. When the two addresses match, terminal 42 recognizes that the communication frame was sent to itself.

Reception signal decoding circuit 8 decodes the received communication frame and writes priority code 102 into field 10a in MPU output reception buffer register 10, destination address code 103 into field 10b, self address code 104 into field 10c and the transmission data into fields 10d through 10e. The transmission data indicates that switch 30 has been turned on. The destination address written into field 10b in MPU output reception buffer register 10 is identical with the self address written in self address register 7 in LAN IC 2a, and the self address written in field 10c is the unique address (that is to say, the self address) assigned to LAN IC 3a of terminal 43, the transmission source.

After reception signal decoding circuit 8 receives the communication frame without error and after the above data are written into MPU output reception buffer register 10, MPU 2b reads it out as the reception data via MPU interface circuit 11.

Thus, from the reception data read out from LAN IC 2a, MPU 2b recognizes that the communication frame is transmitted from terminal 43 to itself (terminal 42) and that switch 30 in terminal 43 is turned on. In response to this fact, MPU 2b activates actuator 20. This operation is programmed into MPU 2b beforehand.

In the conventional communication control apparatus above, for a simple signal transmission such as actuator activation in response to a switch's turning on or off, it is necessary for the microprocessor unit (MPU) to process that switch's turning on and off and to write transmission data into the LAN IC. Therefore, an increased load on the MPU results. Moreover, there must be a an MPU and a LAN IC for each of the switch and the actuator. The outcome is a large, heavy and complicated system with a high manufacturing cost.

SUMMARY OF THE INVENTION

The present invention has been devised in consideration of such circumstances and the object thereof is to provide a communication control apparatus capable of transmitting a signal to each of a plurality of destinations through a communication line by one communication apparatus without any assistance of another apparatus and similarly capable of receiving a signal.

The first embodiment of the communication control apparatus of the invention is a communication control apparatus which transmits a predetermined signal to a predetermined destination when a signal is input from any of a plurality of signal input terminals. The communication control apparatus includes a transmission source/destination address storing unit and a transmission signal generating unit. The transmission source/destination addresses storing unit stores transmission source addresses, specifying each of a plurality of signal input terminals, and transmission destination addresses, specifying the destinations paired in advance with each of the plurality of signal input terminals. The transmission signal generating unit adds to a predetermined signal a transmission source address and a transmission destination address, stored in the transmission source/destination address storing unit and corresponding to the signal input terminals to each of which a signal had been input, when a signal is input from any of a plurality of signal input terminals.

The second invention is a communication control apparatus which outputs a signal to any of a plurality of signal output terminals when a predetermined signal is received from a predetermined reception destination. The communication control apparatus includes a reception source/destination address storing unit and a reception signal decoding unit. The reception source/destination address storing unit stores reception source addresses, specifying a respective plurality of signal output terminals, and reception destination addresses, specifying the transmission source of signals. The reception signal decoding unit compares a transmission destination/source address included in the signal received with a reception source/destination address stored in the reception source/destination address storing unit and outputs a signal to one or a plurality of output terminals having the matched reception source/destination address.

Further, the third embodiment of the invention is a communication control apparatus which transmits a predetermined signal to a predetermined destination when a signal is input from any of a plurality of signal input terminals, and which outputs a signal to any of a plurality of signal output terminals when a predetermined signal is received from a predetermined reception destination. The communication control apparatus includes a transmission source/destination address storing unit, a transmission signal generating unit, a reception source/destination address storing unit and a reception signal decoding unit. The transmission source/ destination address storing unit stores transmission source addresses, specifying each of a plurality of signal input terminals, and transmission destination addresses, specifying each of destinations paired in advance with each of the signal input terminals. The transmission signal generating unit adds to a predetermined signal a transmission source address and a transmission destination address, stored in the transmission source/destination address storing unit and corresponding to the signal input terminals to each of which a signal had been input, where a signal is input from any of a plurality of signal input terminals. The reception source/ destination address storing unit stores reception source addresses specifying a respective plurality of signal output terminals and a plurality of reception destination addresses specifying the transmission source of signals. The reception signal decoding unit compares a transmission destination/ source address included in the signal received with a reception source/destination address stored in the reception source/destination address storing unit when a predetermined signal is received, and outputs a signal to one or a plurality of output terminals with the matched reception source/destination address.

According to the first embodiment of the communication control apparatus of the invention, input signals from a plurality of input terminals can be received directly by a communication control apparatus at the transmission side, and are transmitted to the LAN wiring after being added to respective transmission source/destination addresses by the transmission signal generating unit.

According to the second invention, a communication control apparatus at the reception side receives output signals to a plurality of output terminals, and the reception signal decoding unit specifies the output terminal from which a signal should be output.

In the third embodiment of the communication control apparatus of the invention, a communication control apparatus at the transmission side can directly receive input signals from a plurality of input terminals and transmit them to the LAN wiring after the transmission signal generating unit adds a respective transmission source/destination address. A communication control apparatus at the reception side receives output signals to a plurality of output terminals, and the reception signal decoding unit specifies the output terminal from which a signal should be output.

The above and further objects and features of the invention will more fully be apparent from the following detailed description with accompanying drawings.

BRIEF DESCRIPTION OF THE DRAWINGS

FIG. 6 shows the relationship of FIG. 6A to FIG. 6B

FIGS. 6A and 6B are a block diagram of the internal configuration of a communication control apparatus according to the invention.

FIG. 7 shows the relationship of FIG. 7A to FIG. 7B.

FIGS. 7A and 7B a block diagram of the internal configuration of a communication control apparatus according to the invention.

FIG. 8 shows the relationship of FIG. 8A to FIG. 8B.

FIGS. 8A and 8B area block diagram of the internal configuration of a communication control apparatus according to the invention.

FIG. 9 shows the relationship of FIG. 9A to FIG. 9B.

FIGS. 9A and 9B are block a diagram of the internal configuration of a communication control apparatus according to the invention.

FIG. 10 shows the relationship of FIG. 10A to FIG. 10B.

DESCRIPTION OF THE PREFERRED EMBODIMENT

Figure 1:
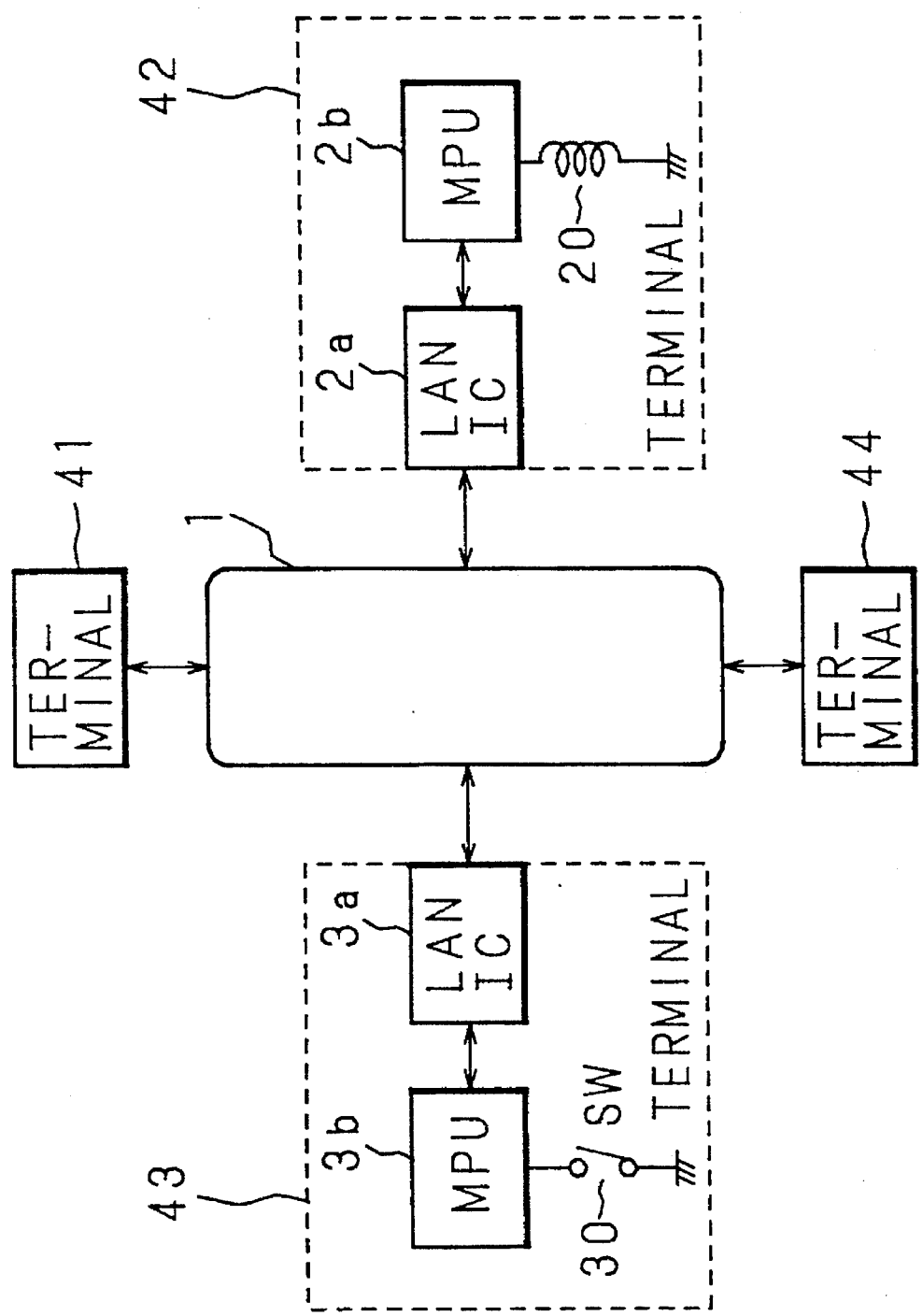
FIG. 1 is a schematic of a conventional LAN system.
Figure 2:
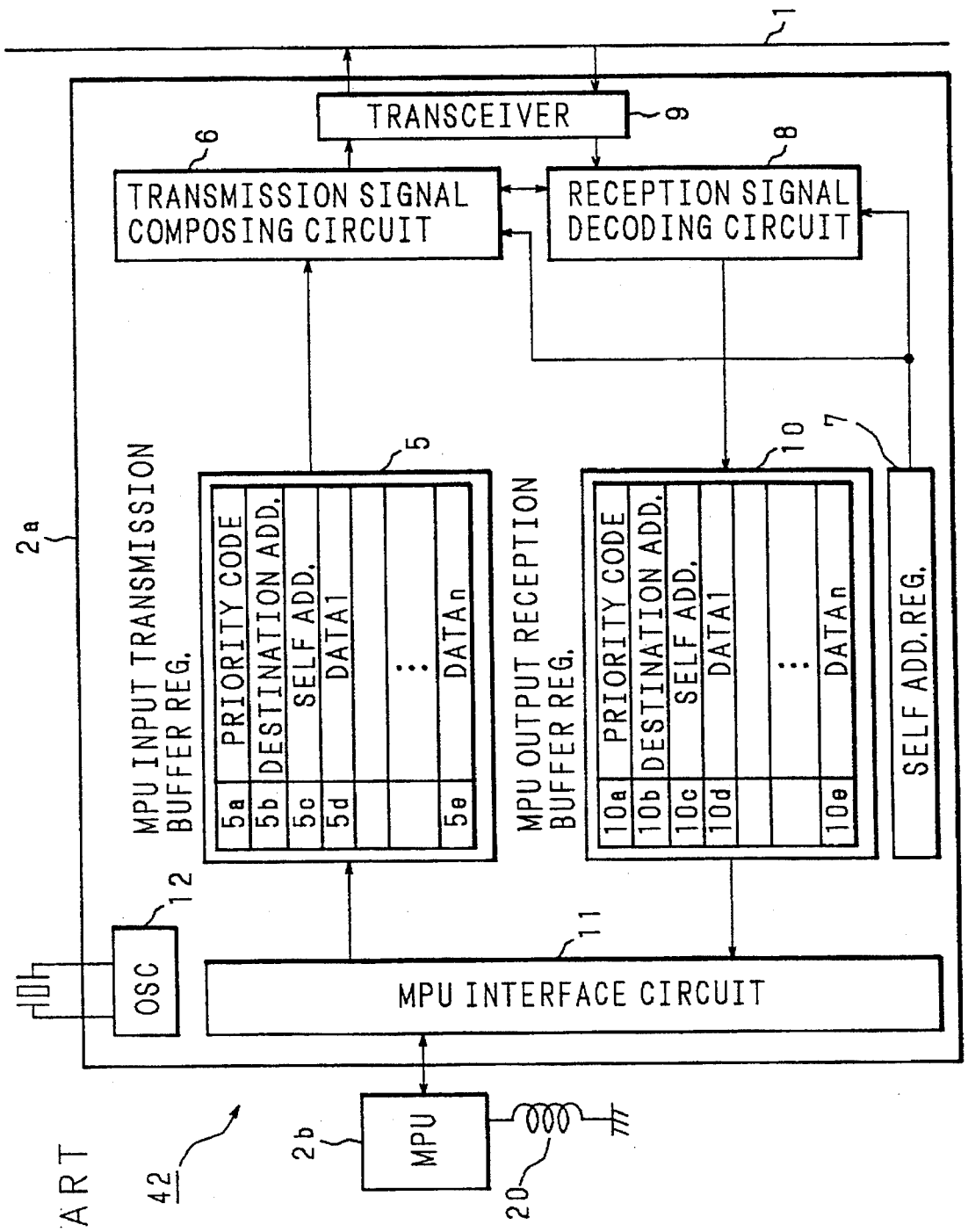
FIG. 2 is a block diagram of the internal configuration of a conventional LAN IC.
Figure 3:
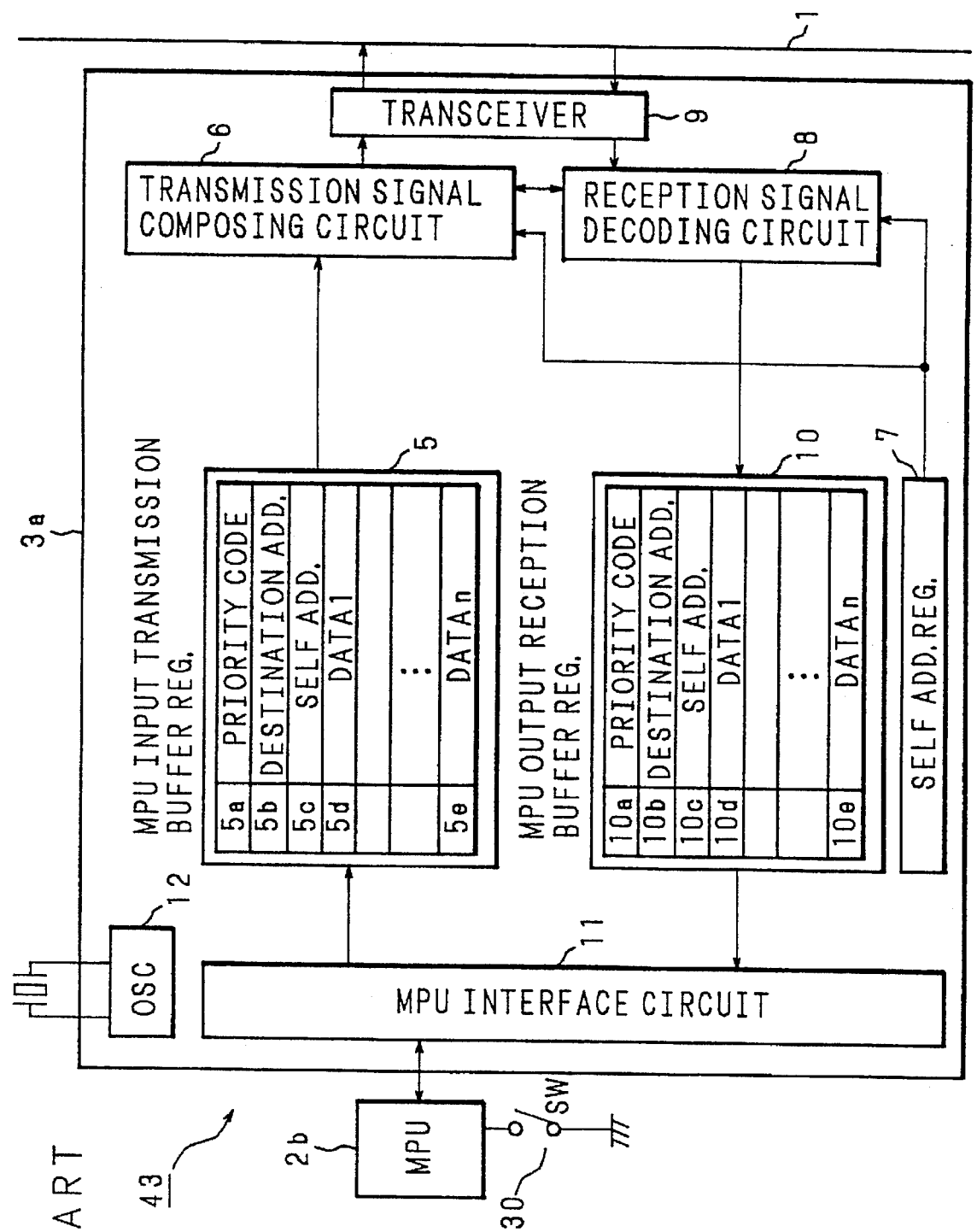
FIG. 3 is a block diagram of the internal configuration of a conventional LAN IC.

In FIGS. 5, 6A, 6B, 7A and 7B, the reference numerals used in FIGS. 1, 2 and 3 indicate identical or equivalent parts.

Figure 5:
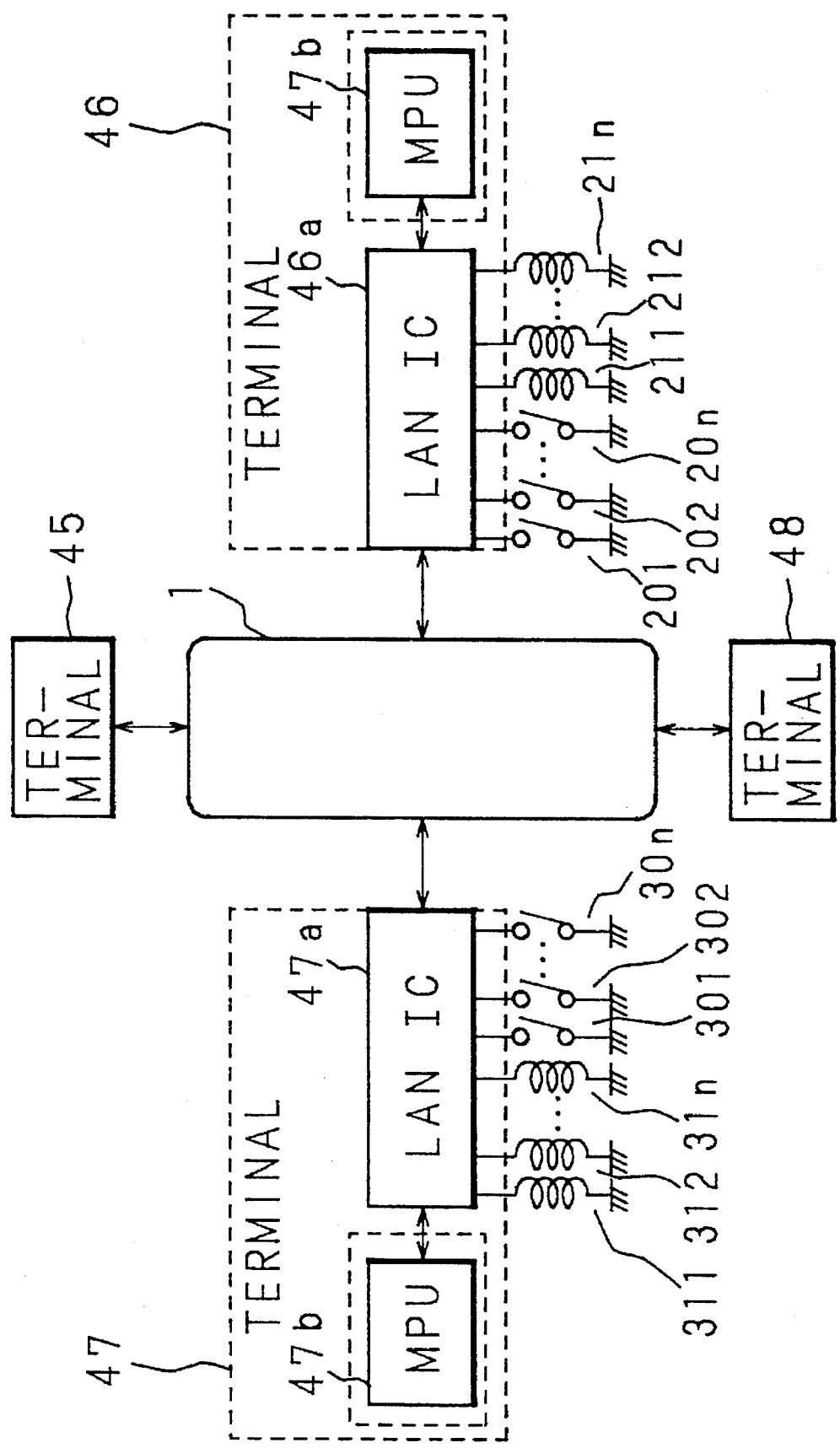
FIG. 5 is a schematic diagram showing a LAN system to which is connected a communication control apparatus according to the invention.

In the example configuration of FIG. 5, four terminals 45, 46, 47 and 48 are connected to transmission line 1, LAN wiring. Each of terminals 45, 46, 47 and 48 includes a LAN IC and a microprocessor (MPU). Terminals 46 and 47 are illustrated in further detail in FIGS. 6A, 6B, 7A and 7B.

Figure 6A:
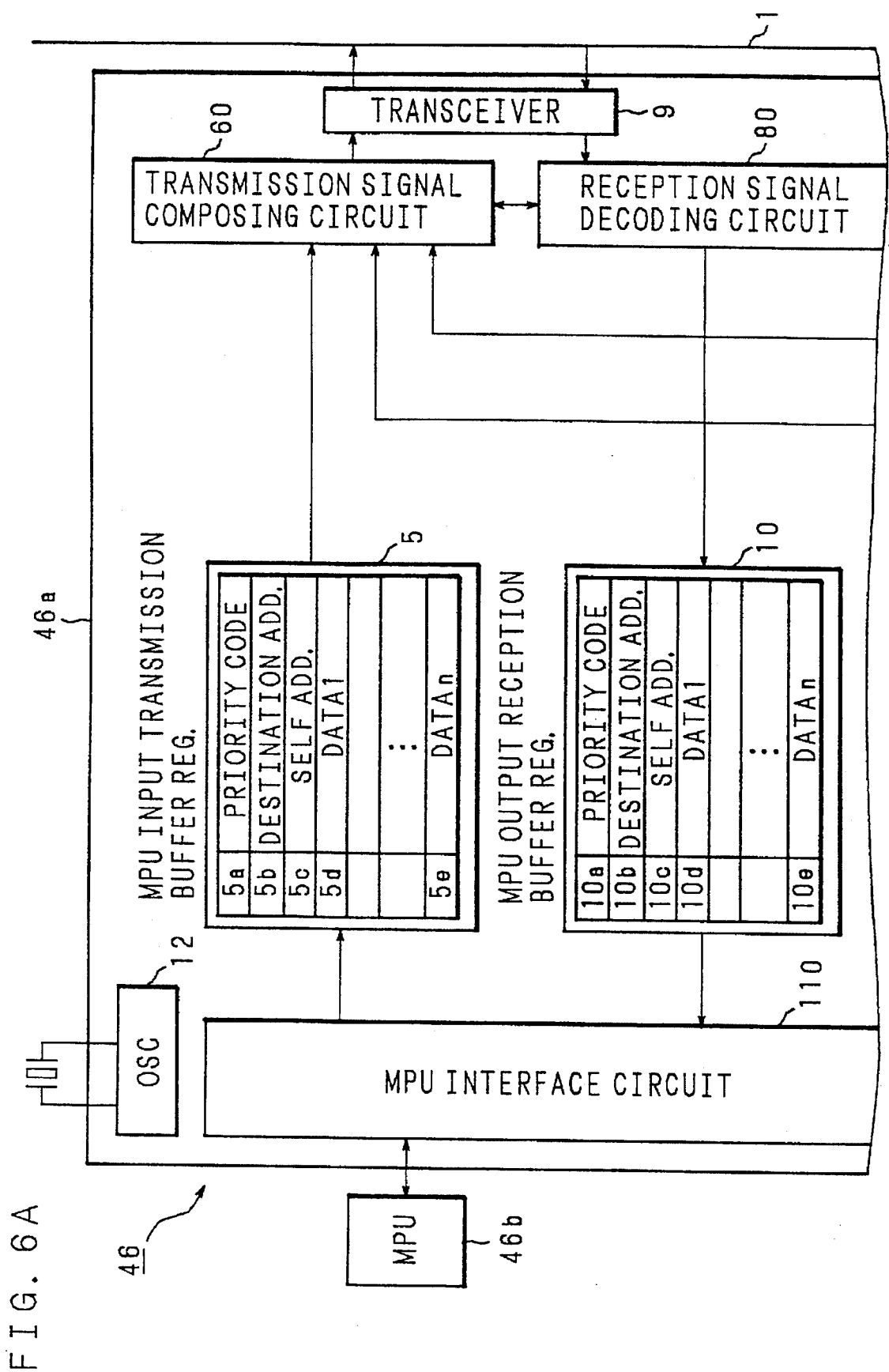
Figures 7, 7A, 7B:
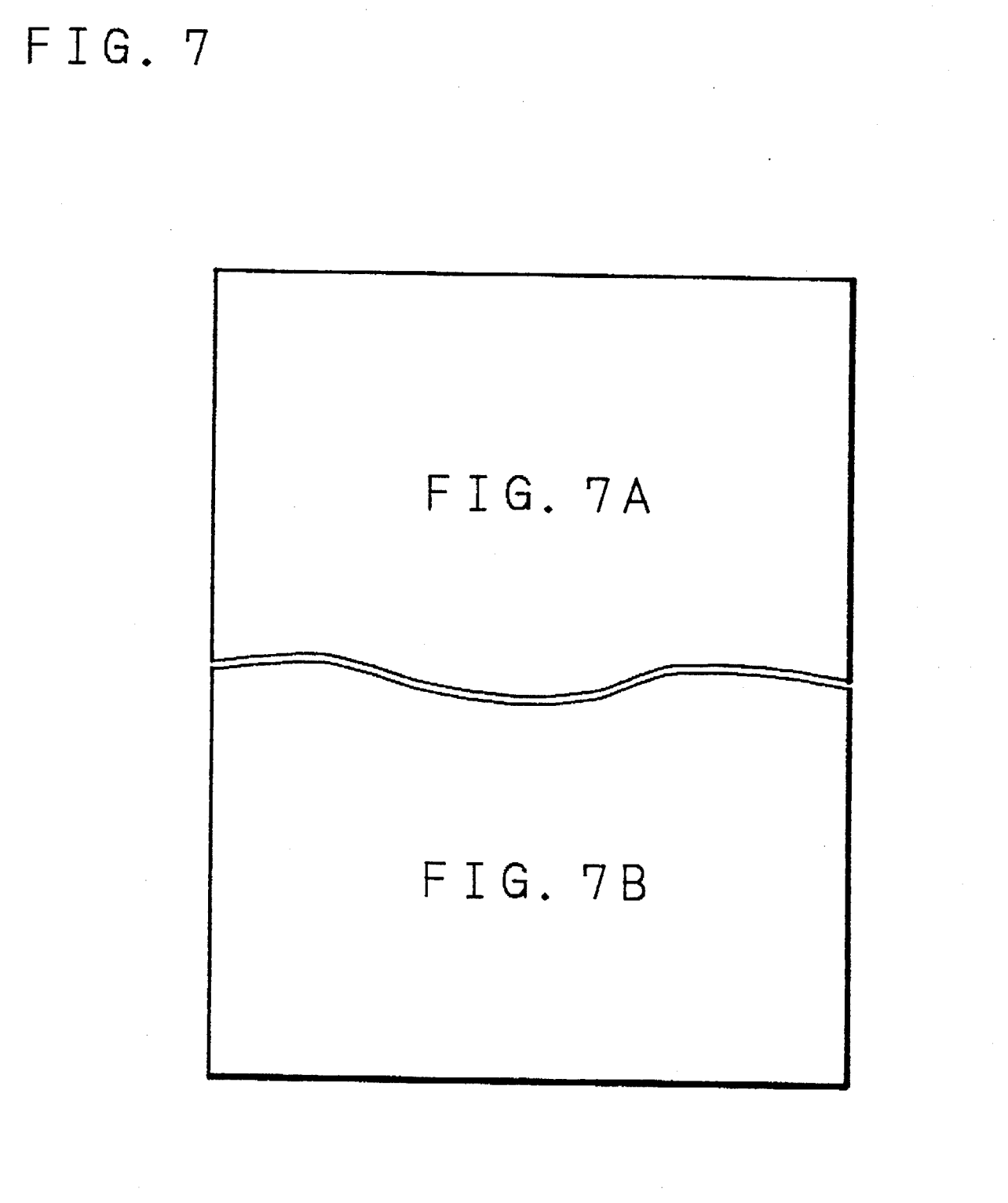
Figure 8B:
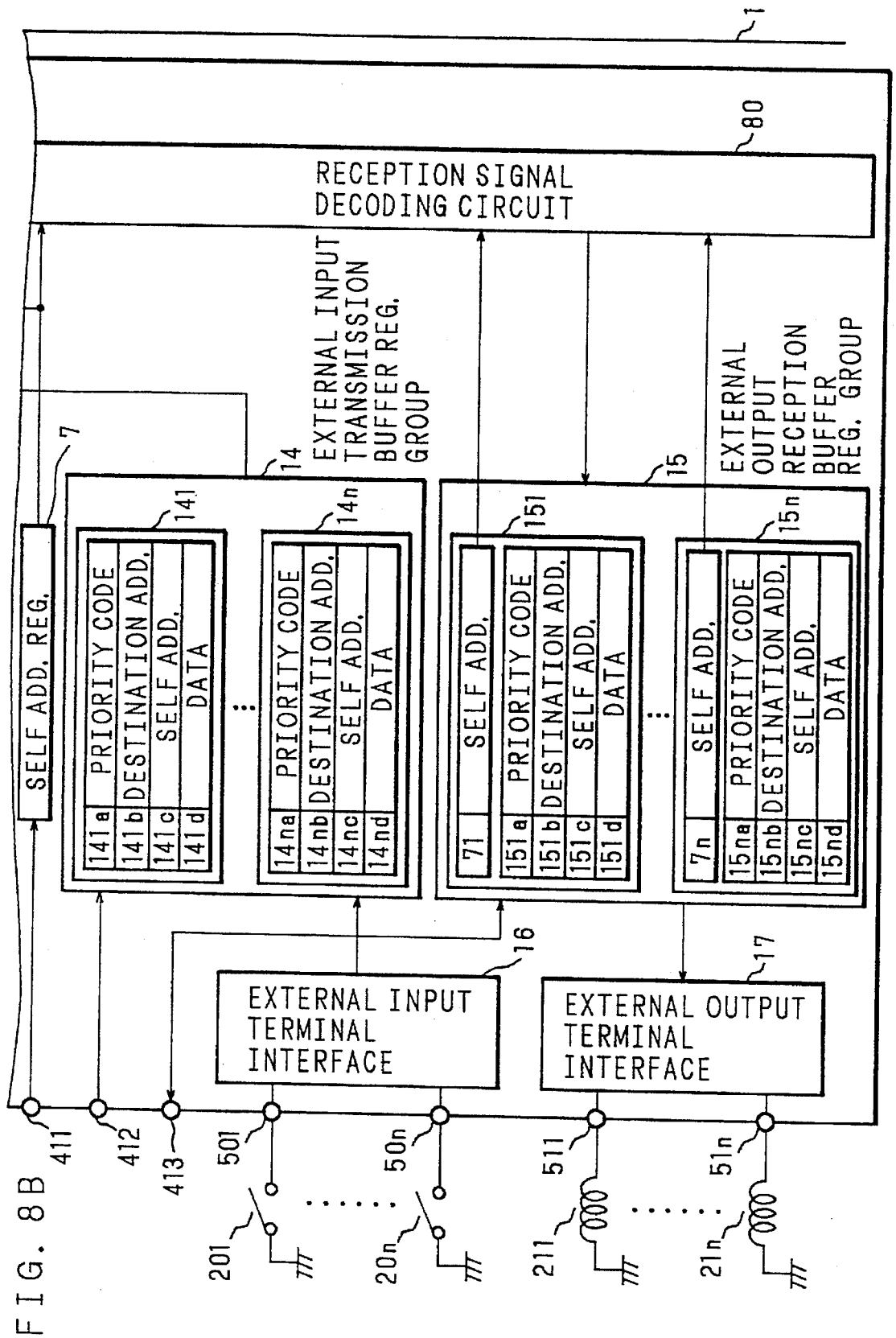
Figure 9A:
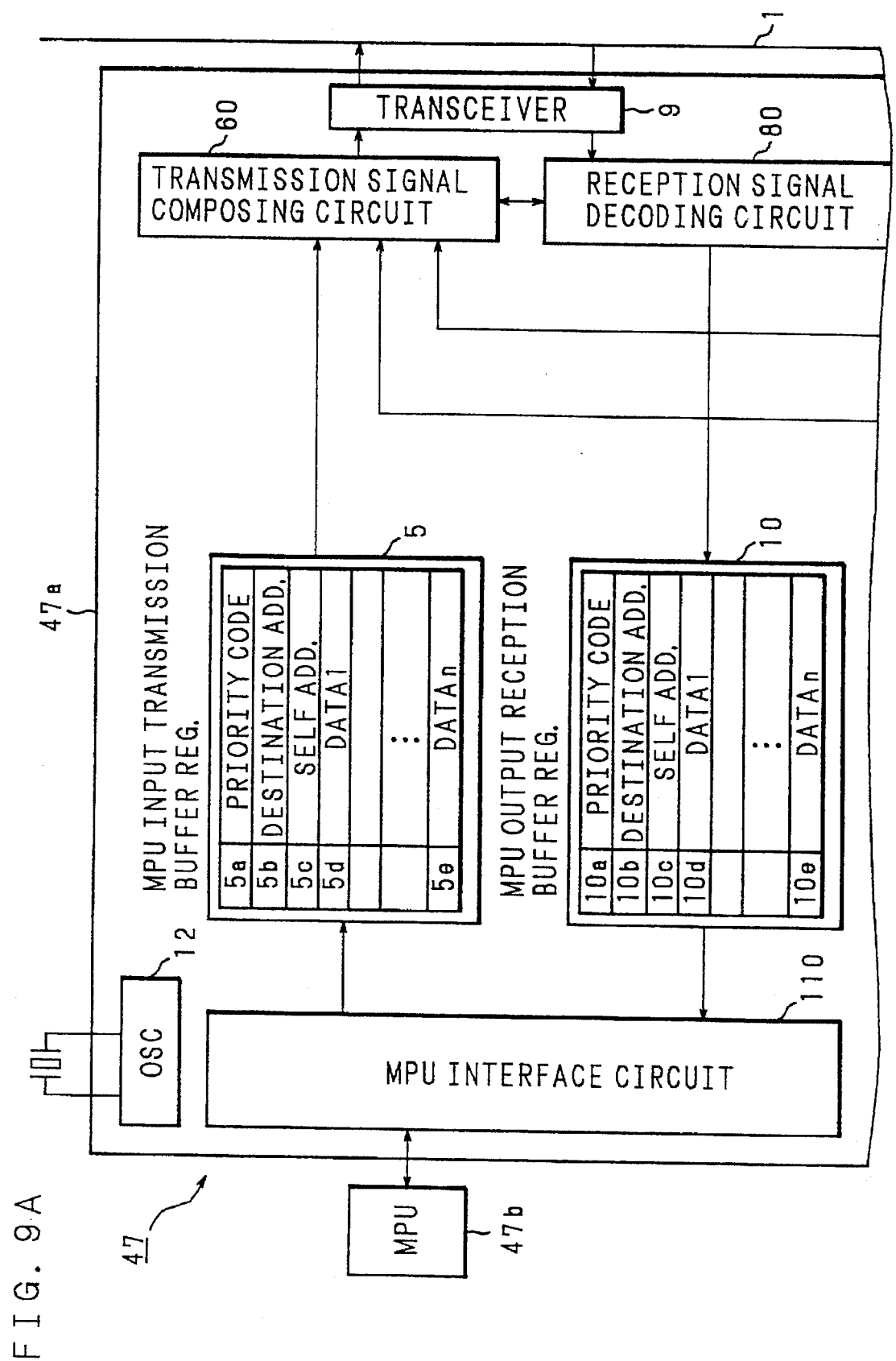

LAN IC 46a shown in FIGS. 6A and 6B and LAN IC 47a shown in FIG. 7A and 7B are provided with an oscillator 12, MPU interface circuit 110, MPU input transmission buffer register 5, transmission signal composing circuit 60, transceiver 9, reception signal decoding circuit 80, MPU output reception buffer register 10 and a self address register 7. Oscillator 12 generates an internal system clock for the IC. MPU interface circuit 110 is an interface with MPU 46b (or MPU 47b). MPU input transmission buffer register 5 temporarily stores data to be transmitted from MPU 46b (or MPU 47b). Transmission signal composing circuit 60 converts the data to be transmitted into a predetermined communication frame format. Transceiver 9 is physically connected to transmission line 1, while reception signal decoding circuit 80 decodes a communication frame format transmitted and received on that transmission line. MPU output reception buffer register 10 temporarily stores received signal data, and self address register 7 stores the unique address assigned to terminal 46 (LAN IC 46a) (or to terminal 47 (LAN IC 47a)).

LAN IC 46a of terminal 46 comprises input terminals 501 through 50n, external input terminal interface circuit 16, external input transmission buffer register group 14, external output terminals 511 through 51n, external output reception buffer register group 15, external output terminals 511 through 51n and an external output terminal interface circuit 17. External input terminal interface circuit 16 is the interface for external switches 201 through 20n connected to input terminals 501 through 50n. External input transmission buffer register group 14 has transmission registers 141 through 14n, each storing data corresponding to switches 201 through 20n, respectively. External output reception buffer register group 15 includes registers 71 through 7n which store the self addresses corresponding to actuators 211 through 21n connected to external output terminals 511 through 51n. Reception data registers 151 through 15n store reception data according to the self address stored in registers 71 through 7n. External output terminal interface circuit 17 is the interface for actuators 211 through 21n.

LAN IC 47a of terminal 47 comprises input terminals 601 through 60n, external input terminal interface circuit 16, external input transmission buffer register group 14, external output terminals 611 through 61n, external output reception buffer register group 15 and external output terminal interface circuit 17. External input terminal interface circuit 16 is the interface for external switches 301 through 30n connected to input terminals 601 through 60n. External input transmission buffer register group 14 has transmission registers 141 through 14n storing data corresponding to switches 301 through 30n, respectively. External output reception buffer register group 15 includes registers 71 through 7n that store the self addresses corresponding to actuators 311 through 31n connected to external output terminals 611 through 61n. Reception data registers 151 through 15n store received data according to the self address stored in registers 71 through 7n. External output terminal interface circuit 17 is the interface for actuators 311 through 31n.

MPU 46b or MPU 47b has previously written the self addresses, the unique addresses assigned to terminals 46 and 47, to actuators 211 through 21n and to actuators 311 through 31n, into the appropriate self address register 7 and fields 71 through 7n of external output reception buffer register group 15. The MPU also has previously written the priority code, the destination address indicating the transmission destination, the self address corresponding to each switch and data to be transmitted are previously written into fields 141a through 14na, 14lb through 14nb, 141c through 14nc and 141d through 14nd, respectively. The MPU accomplishes these writes via MPU interface circuit 110.

Details of the operation of the LAN IC as a communication control apparatus according to the invention are described below. Referring to FIGS. 7A and 7B, the transmitting operation is described. It is assumed that when switch 301, connected to external input terminal 601, is turned on, terminal 47 composes a communication frame including data indicating that switch 301 is turned on and transmits that communication frame to terminal 46.

In particular, when switch 301 is turned on, external input terminal interface circuit 16 detects that turning on via external input terminal 601, and transmission signal composing circuit 60 composes a communication frame format including the data stored in transmission data register 141, the transmission data register which corresponds to external input terminal 601. The format of the communication frame is similar that of the prior art, shown in FIG. 4. Transmission signal composing circuit 6, after computing and adding the CRC code, places the communication frame on transmission line 1 using transceiver 9.

The data stored in external input transmission buffer register group 14 (in external transmission buffer register 141, for example) includes priority code 141a which decides authorized occupation of transmission line 1, destination address which indicates the transmission destination, self address 141c which indicates the transmission source, and data 141d which indicates that switch 301 is turned on.

The unique address corresponding to actuator 211 connected to external output terminal 511 is written into field 141b of transmission data register 141 as the destination address that indicates the transmission destination. The unique address corresponding to switch 301 connected to external input terminal 601 is written into field 141c of transmission data register 141 as the self address that indicates the transmission source.

Referring to FIGS. 6A and 6B, the receiving operation is described. It is assumed that terminal 46 activates actuator 211 connected to external output terminal 511 of LAN IC 46a when terminal 46 receives a communication frame including data indicating that switch 301 of terminal 47 has been turned on.

In LAN IC 46a, transceiver 9 inputs a communication frame from transmission line 1 to reception signal decoding circuit 80. Reception signal decoding circuit 80 compares the data stored in field 71 of reception data register 151 in external output receiving buffer register group 15 (that is, the unique address corresponding to actuator 211 connected to external output terminal 511) with code B 103 in the communication frame (the destination address). Reception signal decoding circuit 80 recognizes the communication frame as intended for itself when the two values match and performs reception processing accordingly.

Reception signal decoding signal circuit 80 decodes the received communication frame and writes the priority code into field 151a in reception data register 151, the destination address into field 151b, the self address into field 151c and the communication data, the data indicating the turning on of switch 301, into field 151d. The destination address data written into field 151b is identical with the data stored in field 71 of reception data register 151. That is to say, the destination address and the self address of actuator 211 are identical. The self address written in field 151c of reception data register 151 is the unique address corresponding to switch 301 connected to external input terminal 601 in terminal 47. That switch 301 is the transmission source.

After reception signal decoding circuit 80 receives the communication frame without error and writes the data into reception data register 151, external output terminal interface circuit 17 recognizes that a communication frame was sent from terminal 47 to itself (terminal 46) indicating that switch 301 in terminal 47 is turned on. External output terminal interface circuit 17 accordingly activates actuator 211 via external output terminal 511.

In the above embodiment, the LAN system is configured such that only one actuator (actuator 211) among the multiple actuators (actuators 211 through 21n) in terminal 46 is activated when one switch (switch 301) in terminal 47 is turned on. The configuration can be changed so that plural actuators are activated in terminal 46 when one switch in terminal 47 is turned on.

In the above preferred embodiment, the LAN system is configured so that the fact of the turning on of switch 301 in terminal 47 is communicated to terminal 46. The LAN system can be configured to transmit this on/off communication with one bit data or to transmit other kinds of information by single or plural bits of data.

MPU 46b confirms the condition of each of the external output terminals of LAN IC 46a by means of cyclically reading out data from reception data registers 151 through 15n via MPU interface circuit 110. When an error on an external output terminal is detected during this process, data indicating the detection of that failure is sent to the MPUs in the other terminals as described below. The condition of the external output terminal is normalized by a procedure such as a reset.

The fault detection communication among MPUs is described for the case where an error in MPU 47b in terminal 47 is communicated to MPU 46b in terminal 46b. When MPU 47b detects the failure of an external output terminal, under a predetermined program, MPU 47b writes corresponding transmission data into MPU input transmission buffer register 5 via MPU interface circuit 110. The transmission data that MPU 47b writes into MPU input transmission buffer register 5 are as follows: the priority code that authorizes occupation of transmission line 1 is stored into field 5a, the destination address that indicates the transmission destination is stored into field 5b, the self address indicating the transmission source is stored into field 5c and the data that indicates the failure detection on the external output terminal is stored into fields 5d through 5e.

The destination address indicating the transmission destination is the specific address of terminal 46. That is to say, the self address of terminal 46 is stored into field 5b of MPU input transmission buffer register 5.

Figure 4:
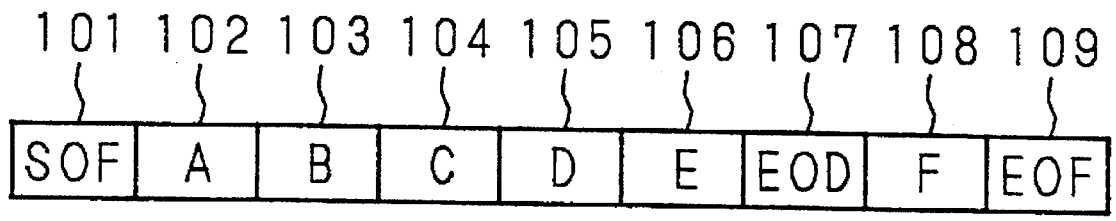
FIG. 4 is a schematic diagram of a conventional format frame for LAN communication.

Thus, after the transmission data are written into MPU input transmission buffer register 5, transmission signal composing circuit 60 composes a communication frame including the data. The format of the communication frame can be as shown in FIG. 4, for example. Transmission composing circuit 60 computes and adds a CRC code and transmits the communication frame on transmission line 1 using transceiver 9.

The receipt of this communication frame is described in detail below with reference to FIGS. 6A and 6B.

In LAN IC 46a, transceiver 9 inputs the communication frame on transmission line 1 to reception signal decoding circuit 80. Reception signal decoding circuit 80 compares the self address, that is, the unique address written in self address register 7 of terminal 46 with code B 105 in the communication frame (the destination address). Reception signal decoding circuit 80 recognizes that the communication frame is intended for itself when the two addresses match. Reception signal decoding circuit 80 performs receiving accordingly.

Reception signal decoding circuit 80 decodes the received communication frame and writes the priority code into field 10a of MPU output reception buffer register 10, the destination address into field 10b, the self address into field 10c and the transmission data into fields 10d through 10e. The destination address data in field 10b is identical to the self address in self address register 7. The self address written in field 10c is the unique (self) address of terminal 47, the transmission source.

After the communication frame is received from reception signal decoding circuit 80 to MPU output reception circuit 10 without error and the above-mentioned data is written, MPU 46b reads out the received data via MPU interface circuit 111. MPU 46b performs predetermined programmed processes according to the particulars of the received data that is read out from LAN IC 46a. In this case, the received data indicates the failure of a signal output terminal of MPU 47b.

In the first embodiment, the LAN system is configured so that, at start up, via MPU interface circuit 110, MPU 46b outputs the self (that is, unique) address assigned to terminal 46 and the self addresses assigned to each of actuators 211 through 21n and stores them in self address register 7 and fields 71 through 7n of each reception data register 151 of external output reception buffer register group 15, respectively. MPU 46b also outputs the data to be stored in fields 141a through 141d of each transmission buffer register group 14 corresponding to switches 201 through 20n. Terminal 47 is similarly configured at start up.

However, as shown in the block diagrams of FIGS. 8A and 8B and FIGS. 9A and 9B, the data can be transferred at start up from other sources (not shown) external to LAN IC 46a (or LAN IC 47a) and stored into the corresponding fields through input terminals 411, 412, 413, 421, 422 and 423. Such other external sources could be hardware such as DIP switches.

Figure 10A:
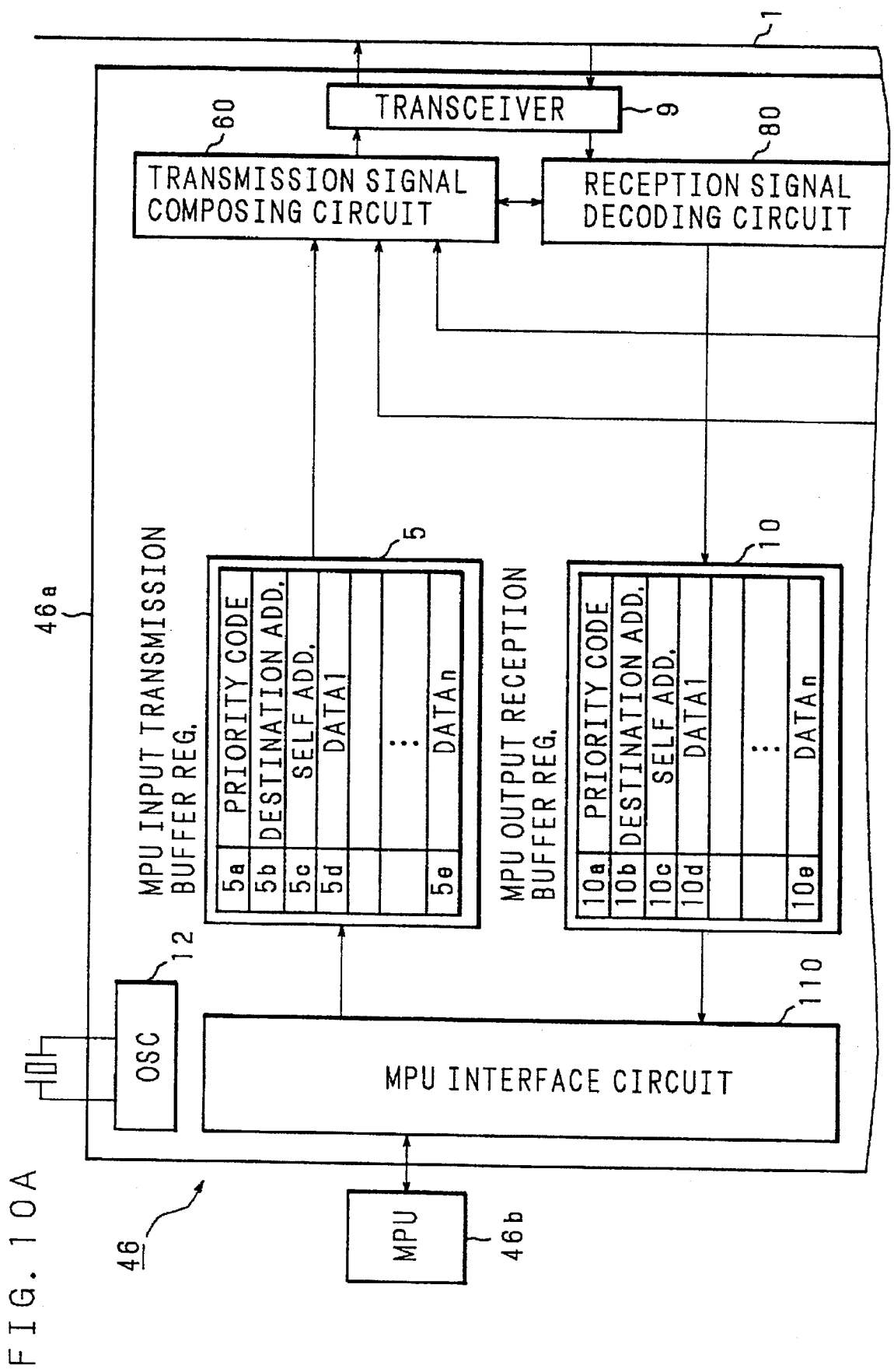
FIGS. 10A and 10B are a block diagram of the internal configuration of a communication control apparatus according to the invention.
Figure 10B:
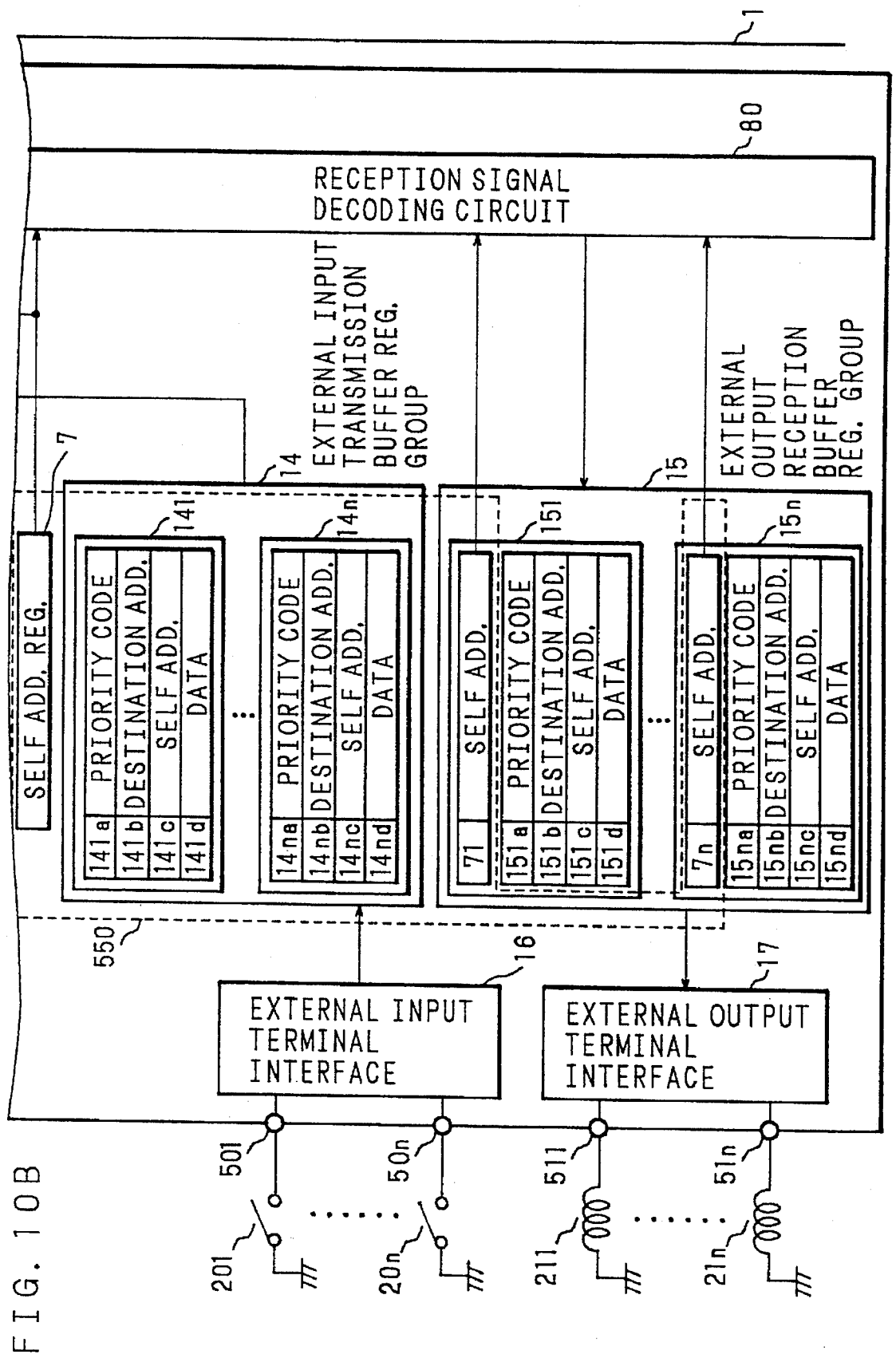

Moreover, instead of data storing at system start up using hardware means as in the above embodiment, the following configuration can be considered. As shown in the block diagram of FIGS. 10A and 10B, self address register 7, external input transmission buffer register group 14 and fields 71 through 7n of external output reception buffer register group 15 can be a ROM 550 (including EPROMs and EEPROMs). In this embodiment, the above data are preset in ROM 550 during the manufacturing process.

Figure 11:
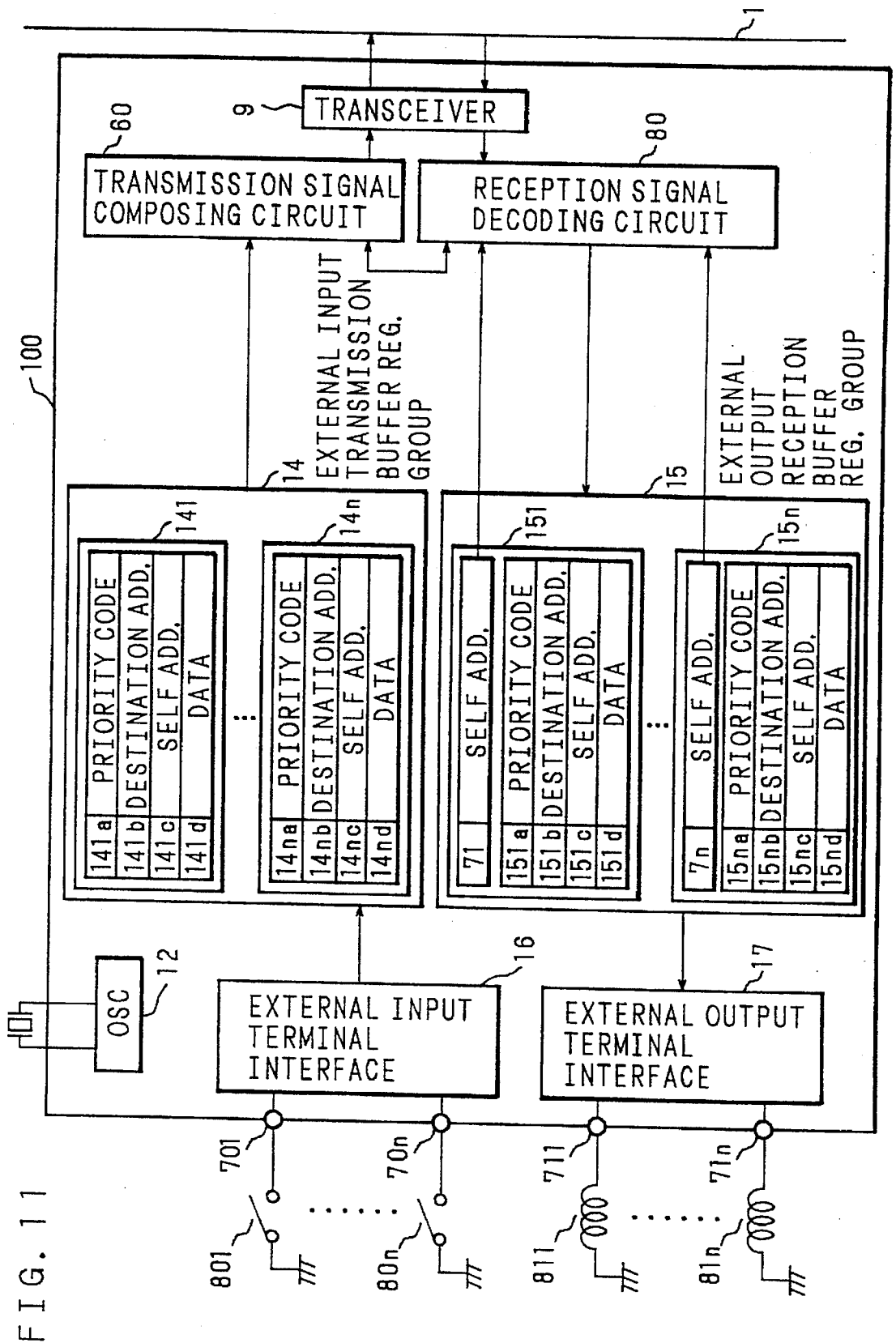
FIG. 11 is a block diagram of the internal configuration of a LAN IC according to the present invention.

In the above-mentioned embodiments of the invention, each terminal 46 and 47 has a LAN IC attached to an MPU. Nonetheless, it is possible to use a LAN IC which is not connected to an MPU 46b. Such a LAN IC 1100, without MPU interface circuit 110, MPU input transmission buffer register 5, MPU output reception buffer register 19 or self address register 7, is shown in FIG. 11.

For this configuration, the data stored in external input transmission buffer register group 14 and in external output reception buffer register group 15 could be, as described above, set up at start up with hardware means or preset in ROM during the manufacturing process. For example, in FIG. 12, LAN IC 101 is equipped with an external input terminal 501 for the input of data to external input transmission buffer register group 14 and with an external terminal 502 for the input of data to external output reception buffer register group 15.

In this preferred embodiment of the invention, communication among the MPUs is not possible, though the other functions are the same as mentioned in other embodiments.

Figure 12:
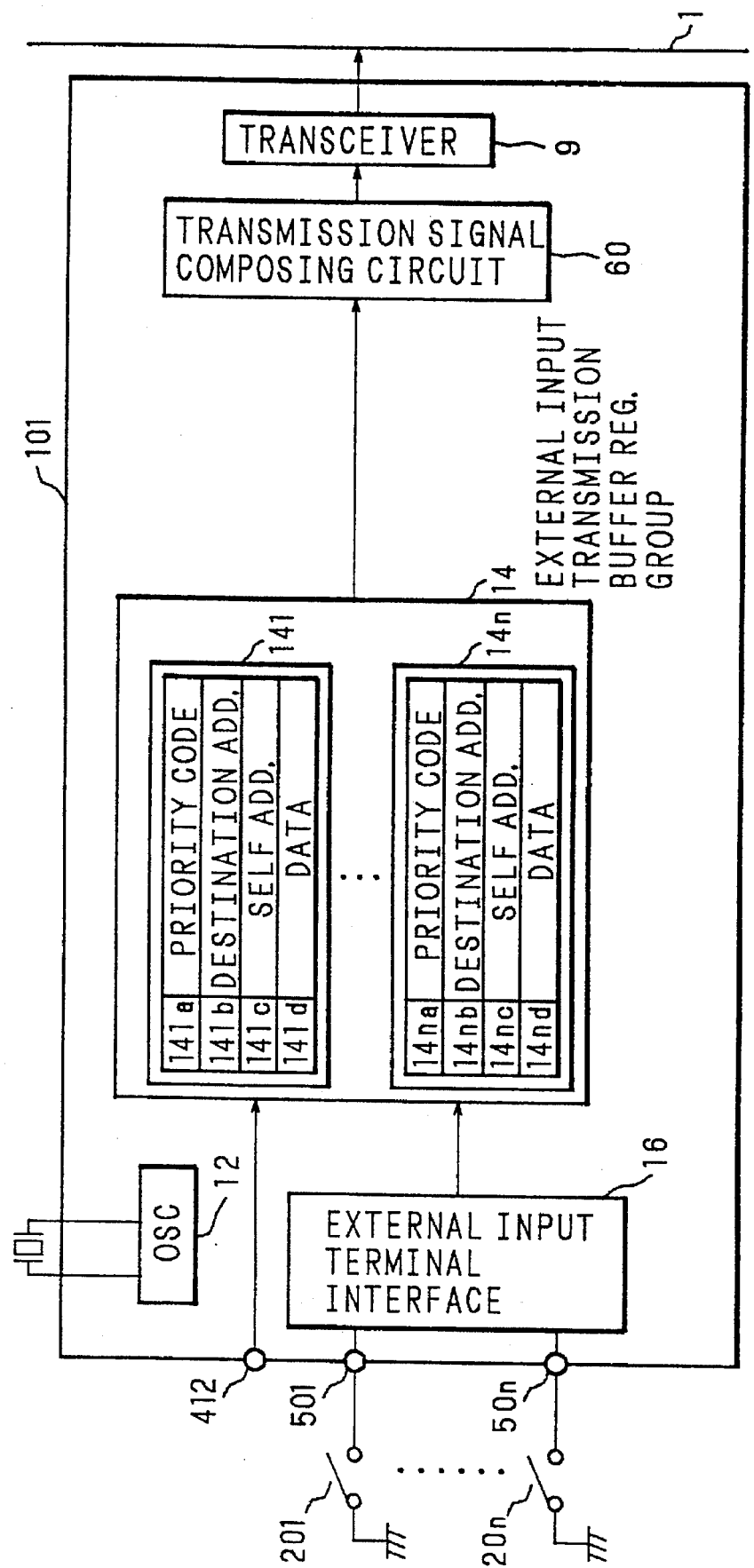
FIG. 12 is a block diagram of the internal configuration of a LAN IC according to the present invention.

For the above embodiments, LAN IC 46a and LAN IC 47a are equipped with both transmitting means for the signal input on the external input terminal to which a switch is connected and with receiving means for a signal to be output on the external output terminal to which an actuator is connected. However, as shown in FIG. 12, a simplified LAN 101 having only transmission means is possible.

Figure 13:
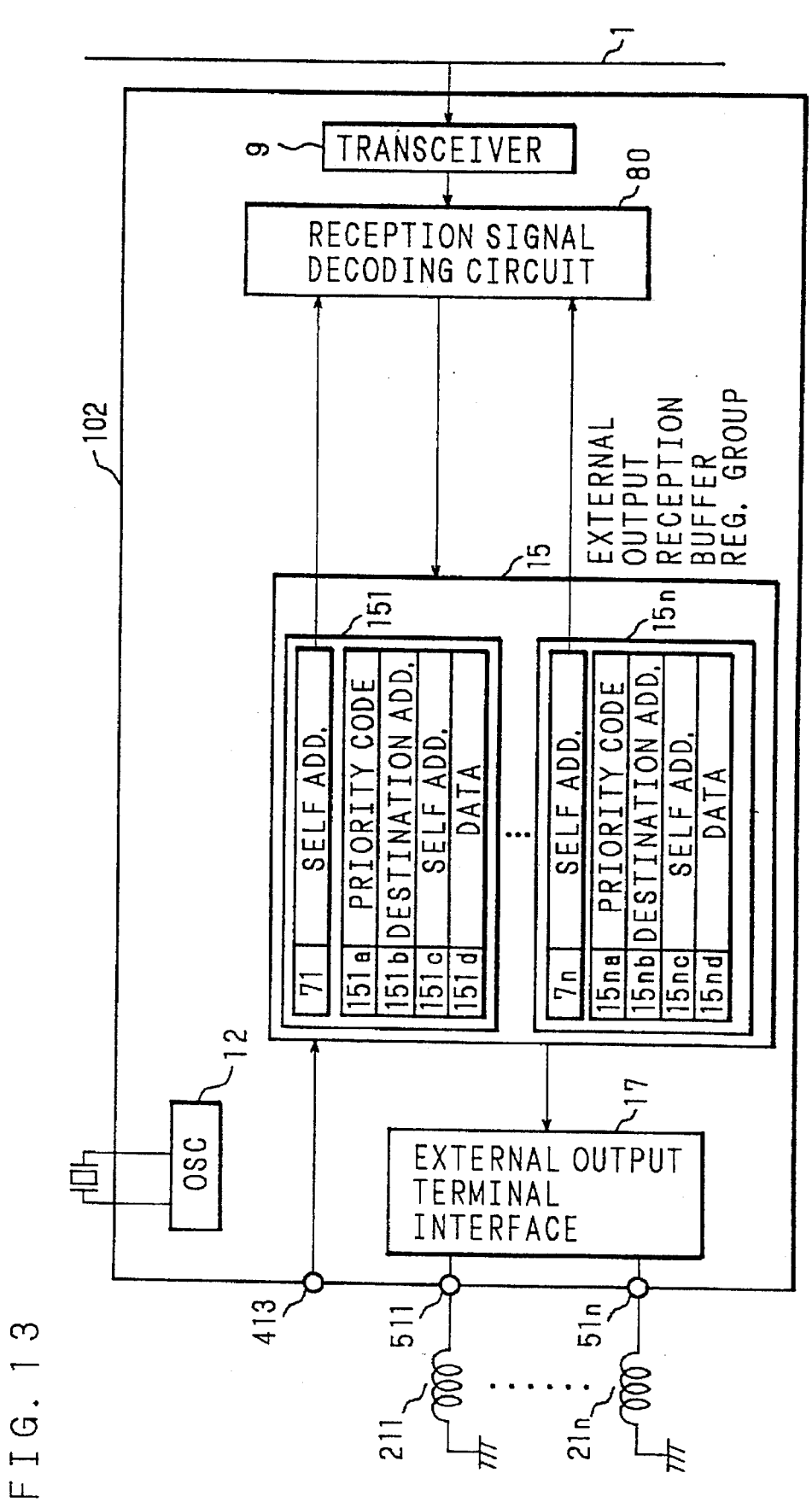
FIG. 13 is a block diagram of the internal configuration of a LAN IC according to the present invention.

Correspondingly, a LAN IC with only reception means is possible. See LAN 102 in FIG. 13.

In the first embodiment, one external output terminal corresponds to one external input terminal. However, a plurality of external output terminals can correspond to one external input terminal. For example, a plurality of actuators can be controlled and driven by an input signal on the switch of only one external input terminal.

Similarly, a plurality of external input terminals can correspond to one specific external output terminal. The specific external output terminal can be controlled and driven by a signal input on any one of a plurality of external input terminals.

For a different approach from the above embodiments, it is possible to configure a system using and combining individual functions of the transmission function corresponding to the external input terminals, the receiving function corresponding to the external output terminals, the transmission function for data input from an external control unit, and the receiving function for data output for an external control unit. It is also possible to build a terminal using LSI chips with the above functions and using a single LSI chip combining the function of those plural LSI chips. The LSI chip(s) may, of course, include other functions beyond the those of the communication control apparatus disclosed here.

As this invention may be embodied in several forms without departing from the spirit of essential characteristics thereof, the present disclosure is therefore illustrative and not restrictive. The scope of the invention is defined by the appended claims rather than by the description preceding them, and all changes that fall within the metes and bounds of the claims, or equivalence of such metes and bounds thereof, are therefore intended to be embraced by the claims.

What is claimed is:

1. A communication control apparatus, comprising:
   a) an external control unit;
   b) a plurality of signal input terminals;
   c) a plurality of signal output terminals;
   d) first transmitting means, comprising
      1) transmission data storing means for storing data sets each corresponding to said plurality of signal input terminals respectively given from said external control unit, said each data set including
         a. an address data which specifies each of said signal input terminal,
         b. an address data which specifies transmission destination of data to be transmitted previously corresponding to each of said signal input terminal when signal input state to any one of said signal input terminals changes, and
         c. a communication data indicating change of signal input state to the corresponding signal input terminal;
      2) transmission external input terminal controlling means for, when signal input state to any one of said signal input terminal changes, detecting the change, and for selecting the data set corresponding to the signal input terminal on which change of signal input state is detected from the data sets previously stored in said transmission data storing means; and
      3) transmission signal composing means for composing a communication frame with respect to the data set selected by said transmission external input terminal controlling means;
   e) first receiving means comprising
      1) reception data storing means for storing unique address data corresponding to each of said plurality of signal output terminals given from said external control unit;
      2) reception signal decoding means for receiving and processing of a communication frame including any one of unique address data stored in said reception data storing means, and for storing
         a. an address data of the transmission source, an address data specifying transmission destination, and
         b. communication data into said reception data storing means as a data set;
      3) external output terminal controlling means for, when said reception signal decoding means receives and processes a communication frame, changing signal output state to one or plural of said plurality of signal output terminals corresponding to the address data specifying the transmission destination including the received frame; and
   f) second transmitting means, comprising
      1) storing means for storing a data set given from said external control unit, said data set including
         a. an address data specifying transmission source,
         b. a communication data to be transmitted, and an address data specifying the transmission destination of the data;
         c. write-controlling means for controlling of writing the data set given from said external control unit into said storing means; and d. transmission signal composing means for composing communication frame with respect to the data set stored in said storing means; and g) second receiving means, comprising
1) a self address register for storing a unique address data corresponding to said external control unit;
2) reception signal decoding means for receiving and processing of a communication frame including the unique address data stored in said self address register;
3) storing means for storing
   a. an address data of the transmission source,
   b. an address data specifying the transmission destination and
   c. communication data as a data set included in the communication frame received and processed by said reception signal decoding means; and
4) means for outputting each data of the data set having been stored in said storing means into said external control unit.

2. The communication control apparatus as set forth in claim 1, further comprising
means for transferring data sets from said reception data storing means to said external control unit.

3. A communication control apparatus, comprising:
a) an external control unit;
b) a plurality of signal input terminals;
c) a plurality of signal output terminals;
d) first transmitting means, comprising
   1) transmission data storing means for previously storing data sets each corresponding to said plurality of signal input terminals respectively, said each data set including
      a. an address data which specifies each of said signal input terminal,
      b. an address data which specifies transmission destination of data to be transmitted previously corresponding to each of said signal input terminal when signal input state to any one of said signal input terminals changes, and a
      c. communication data indicating change of signal input state to the corresponding signal input terminal;
   2) transmission external input terminal controlling means for, when signal input state to any one of said signal input terminal changes, detecting the change, and for selecting the data set corresponding to the signal input terminal on which change of signal input state is detected from the data sets previously stored in said transmission data storing means; and
   3) transmission signal composing means for composing a communication frame with respect to the data set selected by said transmission external input terminal controlling means;
e) first receiving means, comprising
   1) reception data storing means for previously storing unique address data corresponding to each of said plurality of signal output terminals;
   2) reception signal decoding means for receiving and processing of a communication frame including any one of unique address data stored in said reception data storing means, and for storing
      a. an address data of the transmission source, an address data specifying transmission destination, and
      b. communication data into said reception data storing means as a data set;
   3) external output terminal controlling means for, when said reception signal decoding means receives and processes a communication frame, changing signal output state to one or plural of said plurality of signal output terminals corresponding to the address data specifying the transmission destination including the received frame; and
f) second transmitting means, comprising
   1) storing means for storing a data set given from said external control unit, said data set including
      a. an address data specifying transmission source,
      b. a communication data to be transmitted, and
      c. an address data specifying the transmission destination of the data;
   2) write-controlling means for controlling of writing the data set given from said external control unit into said storing means; and
   3) transmission signal composing means for composing communication frame with respect to the data set stored in said storing means; and
g) second receiving means, comprising
   1) a self address register for storing a unique address data corresponding to said external control unit;
   2) reception signal decoding means for receiving and processing of a communication frame including the unique address data stored in said self address register;
   3) storing means for storing an address data of the transmission source, an address data specifying the transmission destination and communication data as a data set included in the communication frame received and processed by said reception signal decoding means; and
   4) means for outputting each data of the data set having been stored in said storing means into said external control unit.

4. The communication control apparatus as set forth in claim 2, further comprising
means for transferring data sets from said reception data storing means to said external control unit.

5. The communication control apparatus as set forth in claim 2, wherein data are previously stored in said transmission data storing means and said reception data storing means from the outside.

6. The communication control apparatus as set forth in claim 2, wherein said transmission data storing means and said reception data storing means are composed of a ROM.

7. A communication control apparatus, comprising:
a) an external control unit;
b) a plurality of signal input terminals;
c) a plurality of signal output terminals;
d) transmitting means, comprising
   1) transmission data storing means for storing data sets each corresponding to said plurality of signal input terminals respectively given from said external control unit, said each data set including
      a. an address data which specifies each of said signal input terminal,
      b. an address data which specifies transmission destination of data to be transmitted previously corresponding to each of said signal input terminal when signal input state to any one of said signal input terminals changes, and
      c. a communication data indicating change of signal input state to the corresponding signal input terminal;
   2) transmission external input terminal controlling means for, when signal input state to any one of said signal input terminal changes, detecting the change, and for selecting the data set corresponding to the signal input terminal on which change of signal input state is detected from the data sets previously stored in said transmission data storing means; and 3) transmission signal composing means for composing a communication frame with respect to the data set selected by said transmission external input terminal controlling means; and e) receiving means, comprising 1) reception data storing means for storing unique address data corresponding to each of said plurality of signal output terminals given from said external control unit;

2) reception signal decoding means for receiving and processing of a communication frame including any one of unique address data stored in said reception data storing means, and for storing
   a. an address data of the transmission source,
   b. an address data specifying transmission destination, and
   c. communication data into said reception data storing means as a data set;

3) external output terminal controlling means for, when said reception signal decoding means receives and processes a communication frame, changing signal output state to one or plural of said plurality of signal output terminals corresponding to the address data specifying the transmission destination including the received frame.

8. The communication control apparatus as set forth in claim 3, wherein data are previously stored in said transmission data storing means and said reception data storing means from the outside.

9. The communication control apparatus as set forth in claim 3, wherein said transmission data storing means and said reception data storing means are composed of a ROM.

10. A communication control apparatus, comprising:

a) an external control unit;

b) a plurality of signal input terminals;

c) a plurality of signal output, terminals;

d) transmitting means, comprising 1) transmission data storing means for storing data sets each corresponding to said plurality of signal input terminals respectively given from said external control unit, said each data set including
   a. an address data which specifies each of said signal input terminal,
   b. an address data which specifies transmission destination of data to be transmitted previously corresponding to each of said signal input terminal when signal input state to any one of said signal input terminals changes, and
   c. a communication data indicating change of signal input state to the corresponding signal input terminal;

2) transmission external input terminal controlling means for, when signal input state to any one of said signal input terminal changes, detecting the change, and for selecting the data set corresponding to the signal input terminal on which change of signal input state is detected from the data sets previously stored in said transmission data storing means; and 3) transmission signal composing means for composing a communication frame with respect to the data set selected by said transmission external input terminal controlling means.

11. The communication control apparatus as set forth in claim 4, wherein data are previously stored in said transmission data storing means and said reception data storing means from the outside.

12. The communication control apparatus as set forth in claim 4, wherein said transmission data storing means and said reception data storing means are composed of a ROM.

13. A communication control apparatus, comprising:

a) an external control unit;

b) a plurality of signal input terminals;

c) a plurality of signal output terminals;

d) receiving means, comprising 1) reception data storing means for storing unique address data corresponding to each of said plurality of signal output terminals given from said external control unit;

2) reception signal decoding means for receiving and processing of a communication frame including any one of unique address data storied in said reception data storing means, and for storing
   a. an address data of the transmission source,
   b. an address data specifying transmission destination, and
   c. communication data into said reception data storing means as a data set;

3) external output terminal controlling means for, when said reception signal decoding means receives and processes a communication frame, changing signal output state to one or plural of said plurality of signal output terminals corresponding to the address data specifying the transmission destination including the received frame; and e) transmitting means, comprising 1) storing means for storing a data set given from said external control unit, said data set including
   a. an address data specifying transmission source,
   b. a communication data to be transmitted, and
   c. an address data specifying the transmission destination of the data;

2) write-controlling means for controlling of writing the data set given from said external control unit into said storing means; and 3) transmission signal composing means for composing communication frame with respect to the data set stored in said storing means; and f) receiving means, comprising 1) a self address register for storing a unique address data corresponding to said external control unit;

2) reception signal decoding means for receiving and processing of a communication frame including the unique address data stored in said self address register;

3) storing means for storing
   a. an address data of the transmission source,
   b. an address data specifying the transmission destination and
   c. communication data as a data set included in the communication frame received and processed by said reception signal decoding means; and 4) means for outputting each data of the data set having been stored in said storing means into said external control unit.

14. The communication control apparatus as set forth in claim 5, wherein data are previously stored in said transmission data storing means and said reception data storing means from the outside.

15. The communication control apparatus as set forth in claim 5, wherein said transmission data storing means and said reception data storing means are composed of a ROM.

* * * * *